(12) United States Patent
Consul et al.

(10) Patent No.: US 8,131,809 B2
(45) Date of Patent: Mar. 6, 2012

(54) ONLINE ARCHIVING OF MESSAGE OBJECTS

(75) Inventors: Ashish Consul, Redmond, WA (US); Rajasi Saha, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 202 days.

(21) Appl. No.: 12/327,419

(22) Filed: Dec. 3, 2008

(65) Prior Publication Data
US 2010/0138500 A1    Jun. 3, 2010

(51) Int. Cl.
*G06F 15/16*    (2006.01)
(52) U.S. Cl. .................................................. 709/206
(58) Field of Classification Search ................. 709/206
See application file for complete search history.

(56) References Cited

U.S. PATENT DOCUMENTS

| | | | | |
|---|---|---|---|---|
| 5,958,005 | A | * | 9/1999 | Thorne et al. ............... 709/202 |
| 6,609,138 | B1 | | 8/2003 | Merriam |
| 6,609,196 | B1 | * | 8/2003 | Dickinson et al. ........... 713/154 |
| 7,107,416 | B2 | | 9/2006 | Stuart |
| 7,730,148 | B1 | * | 6/2010 | Mace et al. .................. 709/206 |
| 7,761,429 | B2 | * | 7/2010 | Polimeni ...................... 707/668 |
| 2004/0177171 | A1 | * | 9/2004 | Ozaki et al. .................... 710/5 |
| 2005/0144520 | A1 | | 6/2005 | Tuma |
| 2006/0031357 | A1 | | 2/2006 | Misra |
| 2006/0075051 | A1 | | 4/2006 | Jain |
| 2007/0033237 | A1 | | 2/2007 | Prahlad |
| 2007/0276883 | A1 | | 11/2007 | Kumar |
| 2008/0034049 | A1 | | 2/2008 | Stokes |

OTHER PUBLICATIONS

Archive One for Email Archiving by Policy, Copyright © 1997-2008 ReSoft International, LLC, 3 pages.
Exchange Mailbox Archiver Agent, accessed Sep. 26, 2008, pp. 1-89, at http://documentation.commvault.com/dell/release_7_0_0/books_online_1/english_us/prod_info/pdf/dm_ex.pdf.
M+Archive, Messaging Architects © 2008, 2 pages.
Manage Engine MailArchiver Plus—4.5, Download 32, Copyright © 1996-2008, 2 pages.
The Importance of Archiving Your Organization's Email Communications, Sherpa Software, Copyright © 2006, 9 pages.

* cited by examiner

*Primary Examiner* — Firmin Backer
*Assistant Examiner* — Brian P Whipple
(74) *Attorney, Agent, or Firm* — Merchant & Gould P.C.

(57) ABSTRACT

This disclosure is directed to automatically moving message objects, such as email message objects, from online source mailbox databases to online archive mailbox databases. As described herein, each email message in a source mailbox database is directly or indirectly associated with a retention policy tag. The retention policy tag associated with a message object in a source mailbox database specifies a retention period. The message object remains in source mailbox database until the retention period expires for the message object. When the retention period for the message object expires, the message object is automatically moved to an archive mailbox database.

18 Claims, 6 Drawing Sheets

ONLINE ARCHIVING OF MESSAGE OBJECTS

BACKGROUND

In today's economy, people exchange dozens of email messages everyday. Some of the email messages a person receives may contain important information. Other ones of the email messages a person receives may not seem important when they are received, but are later discovered to be useful. For this reason, people tend to retain email messages, even email messages of questionable importance, for long periods of time.

Retention of such email messages may cause storage problems for institutions providing email messaging services. For instance, institutions may have to purchase large and expensive data storage systems to store old email messages. In other instances, institutions may configure devices of end-users to store the users' old email messages. Storing email messages on users' computers may increase retrieval costs during e-discovery.

SUMMARY

This disclosure is directed to automatically moving message objects, such as email message objects, from online source mailbox databases to online archive mailbox databases. As described herein, each email message in a source mailbox database is directly or indirectly associated with a retention policy tag. The retention policy tag associated with a message object in a source mailbox database specifies a retention period. The message object remains in source mailbox database until the retention period expires for the message object. When the retention period for the message object expires, the message object is automatically moved to an archive mailbox database.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

DETAILED DESCRIPTION

As briefly described above, the present disclosure is directed to automatically moving message objects, such as email message objects, from online source mailbox databases to online archive mailbox databases. This disclosure refers to a set of figures. These figures are provided for purposes of explanation only and are not intended to represent a sole implementation. In other words, the figures illustrate mere examples.

Figure 1:
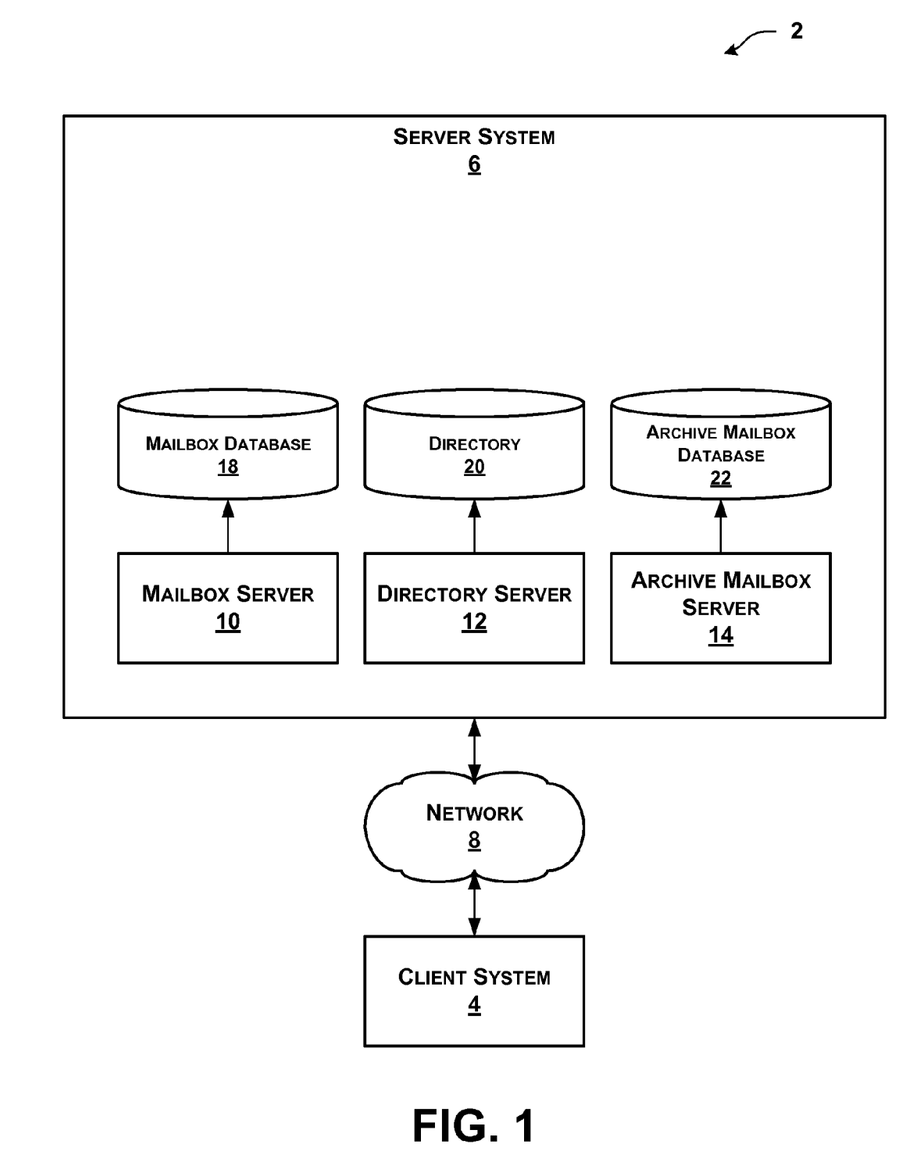
FIG. 1 is a block diagram illustrating an example messaging system.

FIG. 1 is a block diagram illustrating an example messaging system 2. Messaging system 2 facilitates exchanges of messages. As illustrated in the example of FIG. 1, messaging system 2 comprises a client system 4. As used throughout this disclosure, a "client system" is a set of one or more physical electronic computing devices configured to utilize a network service. For example, client system 4 may be a set of one or more personal computers, laptop computers, mobile telephones, television set-top boxes, mainframe computers, standalone server devices, blade server devices, devices integrated into vehicles, handheld computing devices, personal digital assistants, media player devices, and other types of physical computing devices configured to utilize a network service. An example electronic computing device is described below with reference to FIG. 6. Although not illustrated in the example of FIG. 1 for sake of simplicity, messaging system 2 may comprise many client systems like client system 4.

Furthermore, messaging system 2 comprises a server system 6 that provides messaging services. As used throughout this disclosure, a "server system" is a set of one or more physical electronic computing devices that provide a network service. For example, server system 6 may be a set of one or more standalone server devices, blade server devices, mainframe computers, network data centers, intermediate network devices, personal computers, and/or other types of physical electronic computing devices configured to provide a network service. In instances where server system 6 comprises a plurality of electronic computing devices, the electronic computing devices may be geographically dispersed. Furthermore, in instances where server system 6 comprises a plurality of electronic computing devices, the electronic computing devices may communicate with each other using a wired or wireless communications network, a bus, an external device interconnect, or another communications technology. In one example implementation, server system 6 is a special-purpose electronic computing device.

As illustrated in the example of FIG. 1, messaging system 2 includes a network 8. Network 8 is an electronic communications network that facilitates electronic communication between client system 4 and server system 6. For example, network 8 may be a wide-area network, such as the Internet, a local-area network, a metropolitan-area network, or another type of electronic communication network. Network 8 may include wired and/or wireless data links. A variety of communications protocols may be used in network 8 including, but not limited to, Ethernet, Transport Control Protocol (TCP), Internet Protocol (IP), Hypertext Transfer Protocol (HTTP), SOAP, remote procedure call protocols, and/or other types of communications protocols.

In the example of FIG. 1, server system 6 comprises a mailbox server 10 that provides a mailbox access service, a directory server 12 that provides a directory access service, and an archive mailbox server 14 that provides an archive mailbox access service. Mailbox server 10, directory server 12, and archive mailbox server 14 are servers. As used in this disclosure, a "server" is something that provides a service. For instance, a software application that, when executed by a processing unit, provides a service is a server. In another instance, an application-specific integrated circuit (ASIC) that provides a service is a server. In some circumstances, multiple servers may operate on a single physical electronic computing device. In other circumstances, only a single server may operate on a single physical electronic computing device.

It will be appreciated that in various implementations of messaging system 2, one or more of mailbox server 10, directory server 12, and archive mailbox server 14 may be implemented as instructions of software applications operating on one or more electronic computing devices. In a first example, mailbox server 10 and archive mailbox server 14 may be implemented as a software application operating on a first electronic computing device and directory server 12 may be implemented as software applications operating on a second electronic computing device. In a second example, a single electronic computing device may provide the functionality of mailbox server 10, directory server 12, and archive mailbox server 14. In a third example implementation, two separate electronic computing devices may provide the functionality of mailbox server 10. In such implementations, the instructions of the software applications are stored at a computer-readable data storage system. As used in this disclosure, a computer-readable data storage system is a collection of one or more computer-readable data storage media.

In addition, server system 6 comprises a mailbox database 18, a directory 20, and an archive mailbox database 22. Mailbox database 18, directory 20, and archive mailbox database 22 are stored at a data storage system.

Mailbox server 10 provides a mailbox access service that enables clients to access message objects stored in mailbox database 18. As used in this disclosure, a "mailbox" is a logical collection of messaging objects that is associated with a user. A "messaging object" is either a folder or a message object. A "folder" in a mailbox contains a subset of the messaging objects in the mailbox. A "message object" is a collection of properties of a message that provides information to a user. Messages may come in a variety of forms. For example, the messages in a mailbox may be email messages. In a second example, the messages in a mailbox may be calendar messages. Other examples messages include tasks, journal entries, contacts, and so on. The mailboxes stored at mailbox database 18 are peers of one another. As used in this disclosure, a first mailbox is a "peer" of a second mailbox when there does not exist any messaging object in the first mailbox that is also in the second mailbox. In other words, there is no hierarchical relationship between the two mailboxes. Although not illustrated in the example of FIG. 1 for the sake of simplicity, mailbox server 10 may be one of several mailbox servers operating at server system 6. Furthermore, although not illustrated in the example of FIG. 1 for the sake of simplicity, mailbox server 10 may provide access to message objects stored in mailbox databases other than mailbox database 18 and other mailbox servers may provide access to message objects in mailbox database 18 and mailbox databases other than mailbox database 18.

Directory server 12 provides a directory service that provides access to directory 20. Directory 20 stores configuration information for messaging system 2. An administrator of messaging system 2 may be responsible for creating and maintaining the configuration information in directory 20. In one instance, the directory service provided by directory server 12 has a command line interface that enables the administrator to create and maintain configuration information in directory 20. Directory server 12 may be implemented in a variety of ways. For example, directory server 12 may provide an ACTIVE DIRECTORY® directory service. In this example, directory requests and directory responses may be formatted using the Lightweight Directory Access Protocol (LDAP). Although not illustrated in the example of FIG. 1 for the sake of simplicity, directory server 12 may be one of several directory servers operating at server system 6.

Archive mailbox server 14 provides a mailbox access service that provides access to message objects in a set of archive mailboxes in archive mailbox database 22. As used in this disclosure, an "archive mailbox" is a mailbox containing archived messages. An "archived message" is a message retained for occasional reference purposes instead of daily use. Message objects in an archive mailbox are not cached locally at client system 4. The archive mailboxes stored at archive mailbox database 22 are peers of one another and are peers of the mailboxes stored at mailbox server 10. Although not illustrated in the example of FIG. 1 for the sake of simplicity, archive mailbox server 14 may be one of several archive mailbox servers operating at server system 6. Furthermore, although not illustrated in the example of FIG. 1 for the sake of simplicity, archive mailbox server 14 may provide access to message objects stored in archive mailbox databases other than archive mailbox database 22 and other archive mailbox servers may provide access to message objects in archive mailbox database 22 and archive mailbox databases other than archive mailbox database 22.

An administrator may use directory server 12 to create and maintain retention policy tags. A retention policy tag logically represents a retention policy that associates a class of message objects with a retention period. For example, a retention policy tag may logically represent a retention policy that associates message objects that are related to contracts with a retention period of seven years.

To create a retention policy tag, the administrator may specify several parameters. The parameters of a retention policy tag may include a name, a retention period, and an action. The name parameter of a retention policy tag specifies a user-friendly name of the retention policy tag. For example, the name parameter of a retention policy tag may be "Contracts." The retention period parameter of a retention policy tag specifies a retention period of a retention policy. For example, the retention period parameter of a retention policy tag may specify a retention period of seven years. The action parameter of a retention policy tag specifies an action that is to be performed when a retention period of a retention policy expires.

In some implementations, the administrator may specify additional parameters of retention policy tags. For example, in some implementations, the administrator may specify a comment parameter of a retention policy tag. In this example, the comment parameter specifies a narrative description of a retention policy. In other example implementations, the administrator may specify a localized name parameter and a localized comment parameter. The localized name parameter and the localized comment parameter may specify names and comments specific to various cultures. For instance, the localized comment parameter may specify a description of a retention policy in the French language.

The administrator may set the action parameter to a variety of different actions. For instance, the administrator may set the action parameter of a retention policy tag such that message objects to which the represented retention policy is applicable are to be moved from mailbox database 18 to archive mailbox database 22 when the retention period of the retention policy expires. Moving a message object from mailbox database 18 to archive mailbox database 22 entails generating a copy of the message object at archive mailbox database 22 and effectively deleting the message object from mailbox database 18. In this disclosure, such retention policy tags are referred to as archive retention policy tags. Furthermore, in this disclosure, a source mailbox is a mailbox from which a message object is moved when the retention period of an archive retention policy tag for the message object has expired. In another instance, the administrator may set the action parameter of a retention policy tag such that message objects to which the represented retention policy is applicable are to be effectively deleted when the retention period of the retention policy expires. In this disclosure, such retention policy tags are referred to as deletion retention policy tags.

In addition to storing retention policy tags, directory 20 stores configuration data that associates retention policy tags with mailboxes, including the mailboxes in mailbox database 18 and archive mailbox database 22. The administrator may use directory server 12 to create and maintain the configuration data that associates retention policy tags with mailboxes.

Each mailbox is associated with at least one retention policy tag that acts as a default retention policy tag of message objects in the mailbox. In other words, the default retention policy tag associated with a mailbox represents the retention policy for each message object in the mailbox unless another retention policy tag is associated with message objects in the mailbox. In addition to the default retention policy tag of a mailbox, administrator may associate the mailbox with a set of zero or more available retention policy tags. The available retention policy tags associated with a mailbox are retention policy tags that may be assigned to folders or individual message objects in the mailbox. For example, the administrator may associate a mailbox with a first available retention policy tag named "Patents" and a second available retention policy tag named "Business." As described below, a user of client system 4 may choose to associate particular message objects in the mailbox with the "Patents" retention policy tag, other message objects in the mailbox with the "Personal" retention policy tag, and may leave other message objects in the mailbox as associated with the default retention policy tag of the mailbox.

In one example implementation, when the administrator creates or modifies an association between a retention policy tag and a mailbox, mailbox server 10 automatically generates a Folder Applicable Information (FAI) item. A FAI item is a type of message object stored in a mailbox that is not visible as a part of the mailbox, but provides information relevant to managing other message objects in the mailbox. The FAI item generated by mailbox server 10 contains parameters of the retention policy tag. After generating the FAI item, mailbox server 10 adds the FAI item to the mailbox.

Client system 4 presents to a user of client system 4 a user interface that enables the user to interact with mailboxes associated with the user. In one example, client system 4 natively operates a Microsoft OUTLOOK® messaging and collaboration client that presents a graphical user interface. In a second example, client system 4 operates a web browser that presents web pages retrieved from server system 6 that are usable to interact with mailboxes associated with the user.

In one example implementation, the user interface presented by client system 4 allows the user to associate message objects in the user's mailbox with available message policy tags associated with the user's mailbox. In one example, the user's mailbox is associated with a "Patents" retention policy tag and a "Personal" retention policy tag. In this example, as the user is reviewing the email messages in the user's mailbox, the user may associate ones of the email messages that concern patents with the "Patents" retention policy tag and ones of the email messages that concern the user's personal matters with the "Personal" retention policy tag. Furthermore, in this example, the user may choose not to associate some email messages in the user's mailbox with any of the available retention policy tags, thereby effectively associating these email messages with the default retention policy tag of the user's mailbox. In one example implementation, a user may associate a message object with an available retention policy tag by right-clicking on a representation of the message object within the user interface. In this example implementation, right-clicking on the representation of the message object causes the user interface to display a menu that lists the names of each of the available retention policy tags of the mailbox. The user may then associate one of the available retention policy tags with the message object by selecting the available retention policy tag from the menu. In this example implementation, client system 4 may use the FAI item in the mailbox to generate the menu.

The user may also associate folders in the user's mailbox with available message policy tags. When the user associates a folder in the user's mailbox with an available message policy tag, each message object in the folder is, by default, associated with the available message policy tag. For instance, the user may drag a message object that the user has not previously associated with an available retention policy tag into a folder named "Patents" with which the user has associated a "Patents" retention policy tag. In this example, the message object automatically becomes associated with the "Patents" retention policy tag. In this way, the user may be able to associate retention policy tags with message objects while organizing the message objects.

The user may associate a deletion retention policy tag and an archive retention policy tag with each message object or folder. In this way, the user may effectively indicate when a particular message object will be moved to an archive mailbox database and when the particular message will be deleted from any mailbox database in server system 6. The user may not be permitted to associate more than one deletion retention policy tag or more than one archive retention policy tag with a single message object or folder.

When the user associates a message object with a retention policy tag, mailbox server 10 modifies one or more properties of the message object to indicate that the message object is associated with the retention policy tag. For example, each available retention policy tag in a mailbox has a globally unique identifier (GUID). In this example, the GUID of a retention policy tag may be a string of alphanumeric characters. Furthermore, in this example, each message object may have a retention policy tag property. When the user associates a message object with a retention policy tag, mailbox server 10 may modify the retention policy tag of the message object to specify the GUID of the retention policy tag.

Furthermore, when the user associates a message object with a retention policy tag, mailbox server 10 may update an expiration date property of the message object to indicate a date when the retention period of the retention policy tag will expire for the message object. For example, if the message object is an email message sent on Jan. 1, 2009 and the retention period of the message object is ten years, mailbox server 10 updates the expiration date property of the message object to indicate Jan. 1, 2019. Client system 4 may display the expiration date property of the message object along with the message object to inform the user about the expiration date of the message object.

In addition, when the user associates a message object with a retention policy tag, mailbox server 10 may update a retention period property of the message object to indicate the length of the retention period of the retention policy tag. For instance, if the retention period of the retention policy tag is six months, mailbox server 10 updates a retention period property of the message object to indicate six months. Client system 4 may display the retention period property of the message object along with the message object to inform the user about the length of the retention period of the message object.

Furthermore, when the user associates a message object with a retention policy tag, mailbox server 10 may update a start date property of the message object to indicate a date when the retention period starts. For example, a retention policy may indicate that the retention period may start from a time that a message object was last edited. In this example, mailbox server 10 may update the start date property of the message object to indicate a date that the message object was last edited. Client system 4 may display the start date property of the message object along with the message object to inform the user about the start date of the message object.

When the user associates a message object with a retention policy tag, mailbox server 10 may also update a flags property of the message object. The flags property of the message object is a set of bits, each of which has a different significance. Mailbox server 10 updates the flags property of the message object such that one of the bits indicates that the retention policy tag was explicitly associated with the message object. In addition, mailbox server 10 updates the flags property of the message object such that another one of the bits indicates whether the retention policy tag was associated with the message object by the user or was automatically associated with the message object through an auto-tagging process.

As described below with reference to FIGS. 2-5, mailbox server 10 scans through mailboxes in mailbox database 18 and archive mailbox database 22 to determine whether retention periods of retention policies of message objects have expired. If mailbox server 10 determines that a retention period of a retention policy associated with a message object has expired, mailbox server 10 performs the action of the retention policy on the message object. For instance, mailbox server 10 may move the message object from mailbox database 18 to archive mailbox database 22 or may effectively delete the message object. When mailbox server 10 moves the message object from mailbox database 18 to archive mailbox database 22, mailbox server 10 does not forward the message object using an email transfer protocol as a user of client system 4 would do.

Figure 2:
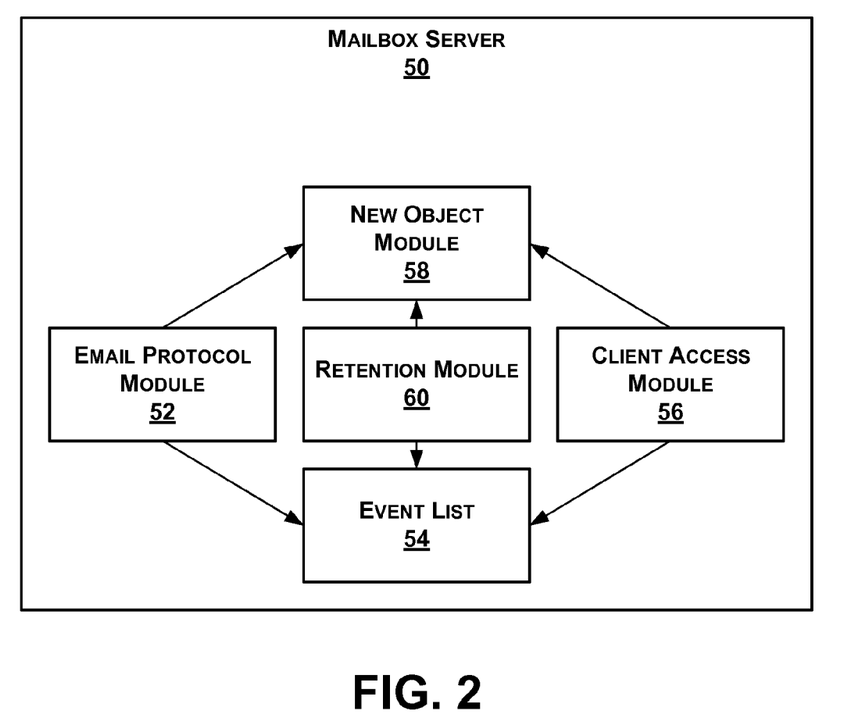
FIG. 2 is a block diagram illustrating example logical details of a mailbox server in a server system in the messaging system of FIG. 1.

FIG. 2 is a block diagram illustrating example logical components of a mailbox server 50. Mailbox server 10 and archive mailbox server 14 may be instances of mailbox server 50. In other words, both mailbox server 10 and archive mailbox server 14 may include the logical components of mailbox server 50. It should be appreciated that mailbox server 50, and hence mailbox server 10 and archive mailbox server 14, may include additional or fewer logical components than are illustrated in the example of FIG. 2. Furthermore, it should be appreciated that the functionality of mailbox server 50 may be differently divided among the logical components illustrated in the example of FIG. 2.

As illustrated in the example of FIG. 2, mailbox server 50 comprises an email protocol module 52. When enabled, email protocol module 52 receives email messages sent via an email transfer protocol to mailbox server 50. Email protocol module 52 may receive email messages via a variety of email transfer protocols including, but not limited to, Simple Mail Transfer Protocol (SMTP), Local Mail Transfer Protocol, and other email transfer protocols. For example, mailbox server 50 may be associated with a domain name "contoso.com." In this example, when someone sends an email message to "joe@contoso.com," email protocol module 52 receives the email message.

When email protocol module 52 receives an email message, email protocol module 52 uses a new object module 58 to add the email message to an identified mailbox in an identified mailbox database. For instance, where mailbox server 10 is an instance of mailbox server 50, email protocol module 52 uses new object module 58 to add the email message to an identified mailbox in mailbox database 18. Email protocol module 52 may identify the mailbox and the mailbox database based on the username portion of a send-to email address of the email message.

After adding the email message to the identified mailbox, email protocol module 52 adds a mailbox event to an event list 54. Event list 54 is a data structure that stores mailbox events. Although the example of FIG. 2 illustrates mailbox server 50 as only including a single event list, mailbox server 50 may include a different event list for each mailbox database accessible through mailbox server 50.

As illustrated in the example of FIG. 2, mailbox server 50 also comprises a client access module 56. When enabled, client access module 56 receives requests from client system 4 to modify messaging objects in mailboxes in mailbox databases accessible through mailbox server 50. For example, client access module 56 may receive requests from client system 4 to send email messages from mailboxes accessible through mailbox server 50. In a second example, client access module 56 may receive requests from client system 4 to delete message objects from mailboxes accessible through mailbox server 50. In a third example, client access module 56 may receive requests from client system 4 to edit message objects in mailboxes accessible through mailbox server 50. In instances where the requests require client access module 56 to add message objects to mailboxes, client access module 56 may use new object module 58 to add the message objects to the mailboxes.

Client access module 56 may receive requests from client system 4 to modify messaging objects in mailboxes accessible through mailbox server 50 via a variety of communications protocols. For example, client access module 56 may receive requests from client system 4 to modify messaging objects via the Post Office Protocol version 3 (POP3) protocol, an Internet Message Access Protocol (IMAP), a remote procedure call protocol, the Simple Object Access Protocol (SOAP), or another communications protocol.

When client access module 56 receives requests to modify messaging objects in mailboxes accessible through mailbox server 50, client access module 56 applies the requests to the mailboxes. After applying the requests to the mailboxes, client access module 56 adds to event list 54 mailbox events describing the changes to the mailboxes.

Furthermore, as illustrated in the example of FIG. 2, mailbox server 50 comprises a retention module 60. Retention module 60 identifies applicable retention policy tags of message objects and applies actions specified by the applicable retention policy tags when the retention periods of the applicable retention policy tags have expired. An example operation of retention module 60 is described below with reference to FIG. 4 and FIG. 5.

Email protocol module 52, event list 54, client access module 56, new object module 58, and retention module 60 may be implemented in a variety of ways. In a first example, email protocol module 52, client access module 56, new object module 58, and/or retention module 60 may be implemented as software instructions that, when executed by a processing unit of server system 6, cause the processing unit to perform particular actions. In this first example, email protocol module 52, event list 54, client access module 56, new object module 58, and/or retention module 60 may be stored on one or more data storage systems. In a second example, email protocol module 52, client access module 56, new object module 58, and/or retention module 60 may be implemented as application specific integrated circuits (ASICs) that perform particular actions. In a third example, email protocol module 52, client access module 56, new object module 58 and/or retention module 60 may be implemented partly as ASICs and partly as instructions that, when executed by a processing unit of server system 6, cause the processing unit to perform particular actions.

Figure 3:
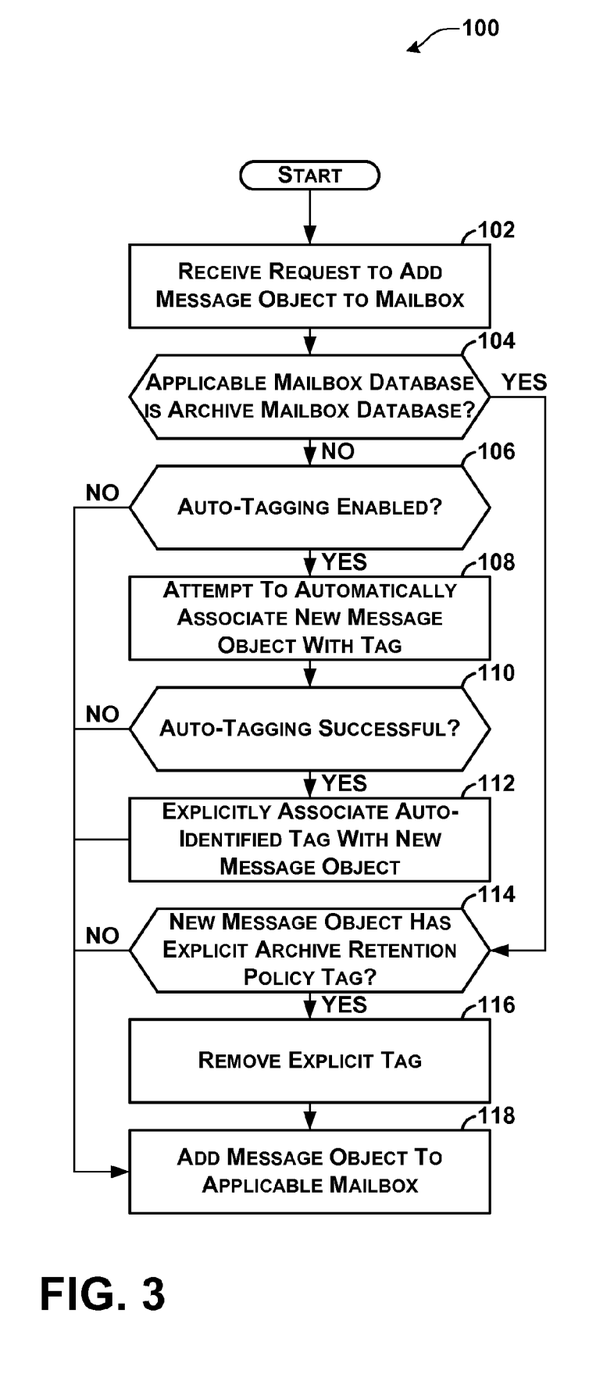
FIG. 3 is a flowchart illustrating an example operation of a new object module in a mailbox server of FIG. 2.

FIG. 3 is a flowchart illustrating an example operation 100 of new object module 58 in mailbox server 50. It should be understood that operation 100 is merely an example of an operation performed by new object module 58. In other implementations, new object module 58 may perform different operations and/or may perform the steps of operation 100 in a different order.

In the example of FIG. 3, operation 100 begins when new object module 58 automatically determines that a message object is to be added to a mailbox (102). When new object module 58 determines that a message object is to be added to a mailbox, new object module 58 automatically determines whether the message object is to be added to an archive mailbox database (104). If the message object is not to be added to an archive mailbox database ("NO" of 104), new object module 58 automatically determines whether auto-tagging is enabled for a mailbox to which the message object is to be added (106). Auto-tagging is an operation that automatically attempts to identify a retention policy tag to associate with a newly-created message object based on contents of the newly-created message object. New object module 58 may use a variety of different types of information to automatically identify a retention policy tag to associate with a message object. For instance, new object module 58 may automatically use text within the message object, a reply-to property of the message object, a subject line prefix of the message object, or other types of information to automatically identify a retention policy tag to associate with a newly-created message object. New object module 58 may automatically identify an archive retention policy tag and/or a deletion retention policy tag for the new message object.

If auto-tagging is enabled ("YES" of 106), new object module 58 automatically attempts to associate the new message object with a retention policy tag available for the applicable mailbox (108). If new object module 58 was able to associate the new message object with a retention policy tag ("YES" of 110), new object module 58 automatically explicitly associates the identified retention policy tag with the new message object (112). New object module 58 may explicitly associate the identified retention policy tag with the new message object by modifying a property of the new message object to specify a GUID of the identified retention policy tag. After explicitly associating the identified retention policy tag with the new message object, if auto-tagging was not successful ("NO" if 110), or if auto-tagging is not enabled ("NO" of 106), new object module 58 automatically adds the new message object to the applicable mailbox database (118).

If the new message object is applicable to an archive mailbox database ("YES" of 104), new object module 58 automatically determines whether the new message object has an explicit retention policy tag (114). If new object module 58 determines that the new message object does not have an explicit retention policy tag ("NO" of 114), new object module 58 automatically adds the new message object to the applicable mailbox database (118). If new object module 58 determines that the new message object has an explicit archive retention policy tag ("YES" of 114), new object module 58 automatically removes the explicit archive retention policy tag from the new message object (116). New object module 58 removes the explicit archive retention policy tag from the new message object because the archive retention policy tag would serve no purpose when the new message object is added to an archive mailbox database. It may be noted that in the example of FIG. 3, new object module 58 does not remove explicit deletion retention policy tags. Thus, message objects in archive mailbox databases may be deleted according to retention policies that users explicitly associated with the message objects. After removing the explicit archive retention policy tag from the new message object, new object module 58 automatically adds the new message object to the applicable mailbox database (118).

Figure 4:
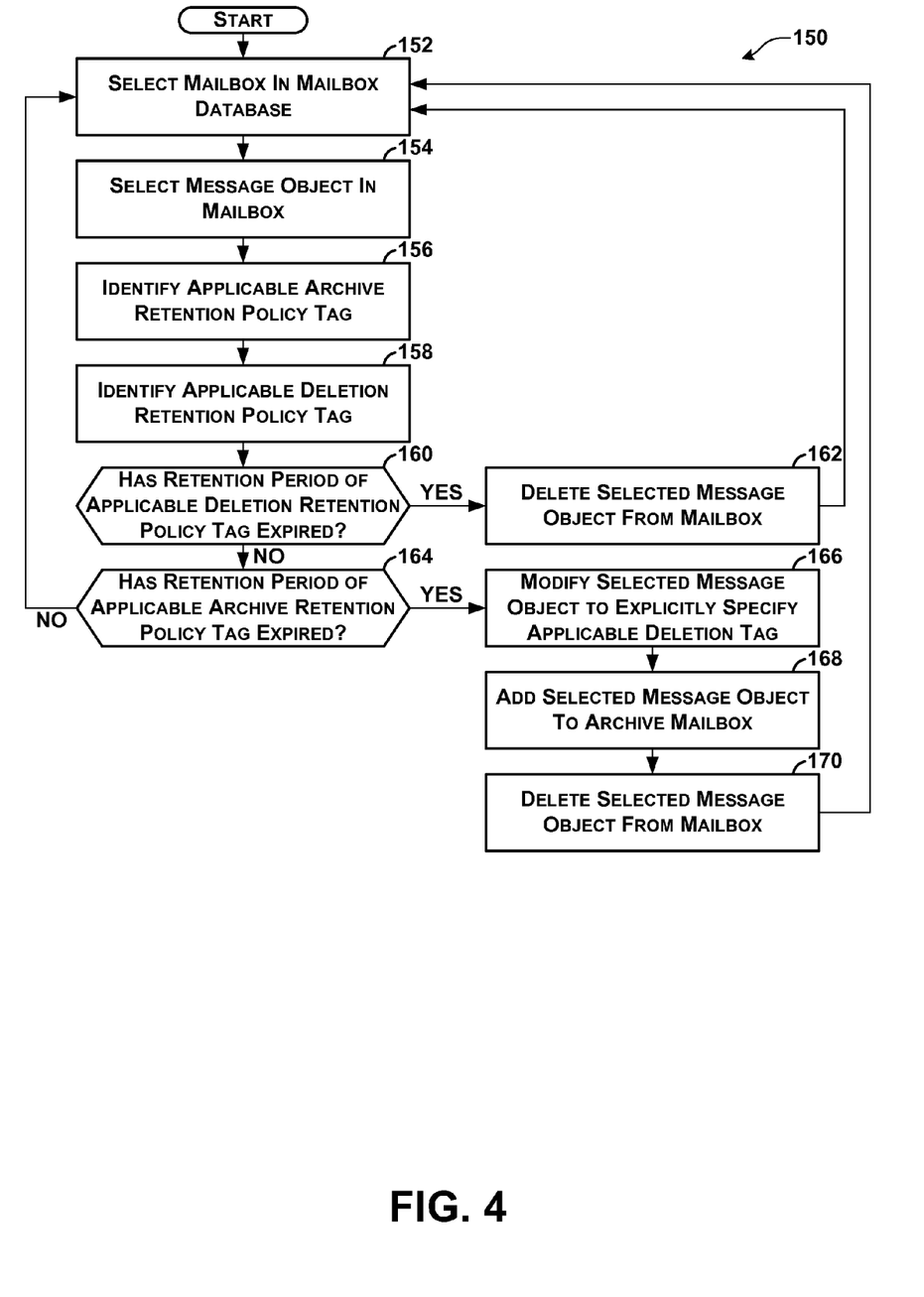
FIG. 4 is a flowchart illustrating an example operation of a retention module in the mailbox server of FIG. 2.

FIG. 4 is a flowchart illustrating an example operation 150 of retention module 60 in mailbox server 50. It should be understood that operation 150 is merely an example of an operation performed by retention module 60. In other implementations, retention module 60 may perform different operations and/or may perform the steps of operation 150 in a different order.

In the example of FIG. 4, operation 150 begins when retention module 60 automatically selects a mailbox in a mailbox database accessible through mailbox server 50 (152). For instance, in the case of mailbox server 10, mailbox server 10 may select a mailbox in mailbox database 18 or, in the case of archive mailbox server 14, archive mailbox server 10 may select a mailbox in archive mailbox database 22. Retention module 60 may select the mailbox according to a pseudorandom or a deterministic process. Next, retention module 60 selects a message object in the selected mailbox (154). Retention module 60 may select the message object according to a pseudorandom or a deterministic process. After selecting the message object, retention module 60 identifies an applicable archive retention policy tag for the selected message object (156). Next, retention module 60 identifies an applicable deletion retention policy tag for the selected message object (158). Retention module 60 may use the example operation illustrated in FIG. 5 to identify the applicable archive retention policy tag and the applicable deletion retention policy tag. It will be understood that retention module 60 may perform steps other than those illustrated in the example of FIG. 5 to identify an applicable archive retention policy tag or an applicable deletion retention policy tag for the selected message object.

After retention module 60 has identified the applicable deletion retention policy tag for the selected message object, retention module 60 automatically determines whether the retention period of the applicable deletion retention policy tag has expired for the selected message object (160). Retention module 60 may determine whether the retention period of the applicable deletion retention policy tag has expired for the selected message object in a variety of ways depending on the type of the selected message object. For instance, if the selected message object is an email message, retention module 60 may determine that retention period of the applicable deletion retention policy has expired for the email message when an amount of time equal to the retention period has passed after the email message was sent. In another example, if the selected message object is a calendar object, retention module 60 may determine that the retention period of the applicable retention policy has expired for the calendar object when an amount of time equal to the retention period has passed after an ending time of an event signified by the calendar object.

If retention module 60 determines that the retention period of the applicable deletion retention policy tag has expired for the selected message object ("YES" of 160), retention module 60 automatically effectively deletes the selected message object from the selected mailbox (162). After effectively deleting the selected message object from the selected mailbox, retention module 60 loops back and again selects a mailbox (152).

If retention module 60 determines that the retention period of the applicable deletion retention policy tag has not expired for the selected message object ("NO" of 160), retention module 60 automatically determines whether the retention period specified by the applicable archive retention policy tag has expired for the selected message object (164). If retention module 60 determines that the retention period specified by the applicable archive retention policy tag has not expired for the selected message object ("NO" of 164), retention module 60 loops back and again selects a mailbox (152).

If retention module 60 determines that the retention period specified by the applicable archive retention policy tag has expired for the selected message object ("YES" of 164), retention module 60 modifies the selected message object to explicitly specify the applicable deletion retention policy tag (166). Retention module 60 modifies the selected message object to explicitly specify the applicable deletion retention policy tag to ensure that the applicable deletion retention policy tag is still applied to the selected message object after the selected message object is moved to the archive mailbox database.

After modifying the selected message object, retention module 60 adds the selected message object to an archive mailbox (168). In one example implementation, retention module 60 uses new object module 58 to add the selected message object to the archive mailbox. Next, retention module 60 deletes the selected message object from the selected mailbox (170). After deleting the selected message object, retention module 60 loops back and again selects a mailbox in the mailbox database (152).

Figure 5:
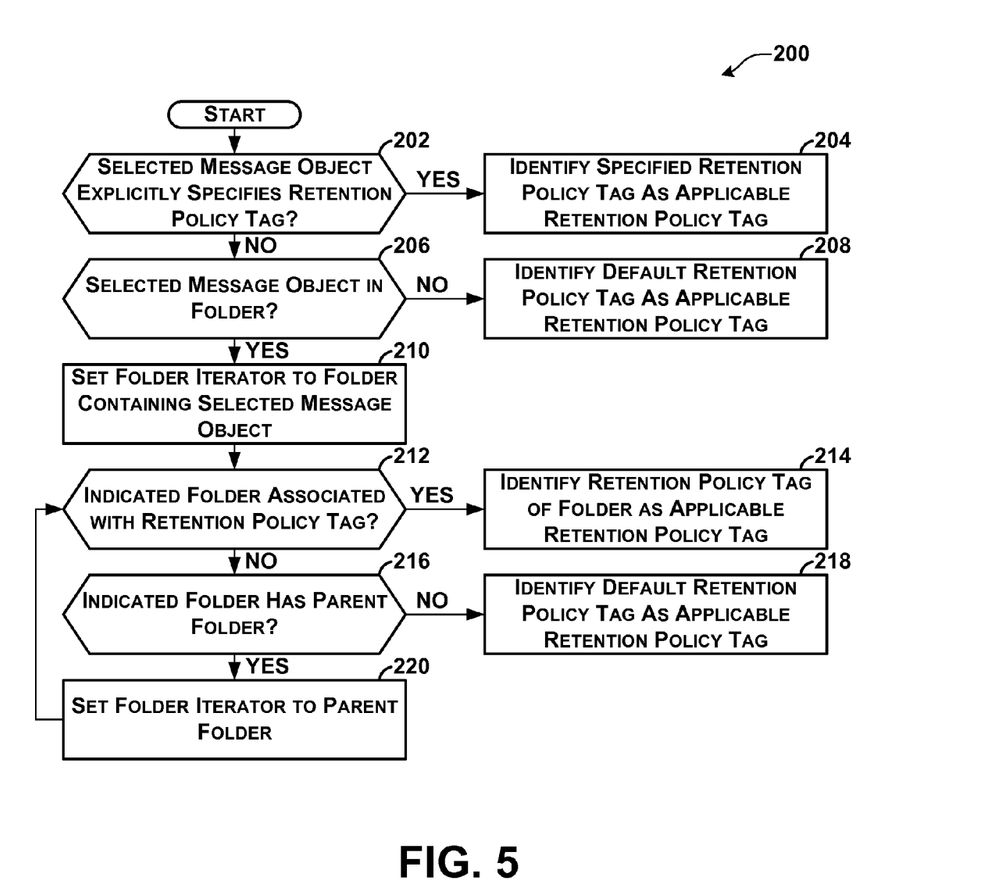
FIG. 5 is a flowchart illustrating an example operation of the retention module of FIG. 2 to identify an applicable retention policy tag for a selected message object.

FIG. 5 is a flowchart illustrating an example operation 200 of retention module 60 to identify an applicable retention policy tag for a selected message object. It should be understood that operation 200 is merely an example of an operation performed by retention module 60. In other implementations, retention module 60 may perform different operations and/or may perform the steps of operation 200 in a different order. Retention module 60 may perform operation 200 to identify an applicable archive retention policy tag for a selected message object and/or an applicable deletion retention policy tag for the selected message object.

In the example of FIG. 5, operation 200 begins when retention module 60 automatically determines whether the selected message object explicitly specifies a retention policy tag (202). As explained above with regard to one example implementation, a message object may explicitly specify a retention policy tag when the message object includes a property that specifies a GUID of a retention policy tag. If retention module 60 determines that the selected message object explicitly specifies a retention policy tag ("YES" of 202), retention module 60 automatically identifies the retention policy tag specified by the selected message object as the applicable retention policy tag for the selected message object (204).

On the other hand, if retention module 60 determines that the selected message object does not explicitly specify a retention policy tag ("NO" of 202), retention module 60 automatically determines whether the selected message object is in a folder (206). If retention module 60 determines that the selected message object is not in a folder ("NO" of 206), retention module 60 automatically identifies a default retention policy tag of the mailbox that contains the selected message object as the applicable retention policy tag for the selected message object (208). Retention module 60 may use an FAI item in the mailbox to identify the default retention policy tag of the mailbox.

If retention module 60 determines that the selected message object is in a folder ("YES" of 206), retention module 60 automatically sets a folder iterator to the folder that contains the selected message object (210). The folder iterator is a data structure that serves to identify a folder in a mailbox. Next, retention module 60 automatically determines whether a folder indicated by the folder iterator (i.e., the indicated folder) is associated with a retention policy tag (212). If retention module 60 determines that the indicated folder is associated with a retention policy tag ("YES" of 212), retention module 60 automatically identifies the retention policy tag associated with the indicated folder as the applicable retention policy tag for the selected message object (214).

If retention module 60 determines that the indicated folder is not associated with a retention policy tag ("NO" of 212), retention module 60 automatically determines whether the indicated folder has a parent folder (216). If retention module 60 determines that the indicated folder does not have a parent folder ("NO" of 216), retention module 60 automatically identifies a default retention policy tag of the mailbox that contains the selected message object as the applicable retention policy tag of the selected message object (218).

Otherwise, if retention module 60 determines that the indicated folder has a parent folder ("YES" of 216), retention module 60 automatically sets the folder iterator to the parent folder (220). After setting the folder iterator to the parent folder, retention module 60 loops back and again automatically determines whether the indicated folder (i.e., the parent folder) is associated with a retention policy tag (212), and so on. In this way, retention module 60 may move up a folder hierarchy, attempting to identify retention policy tags associated with folders.

Figure 6:
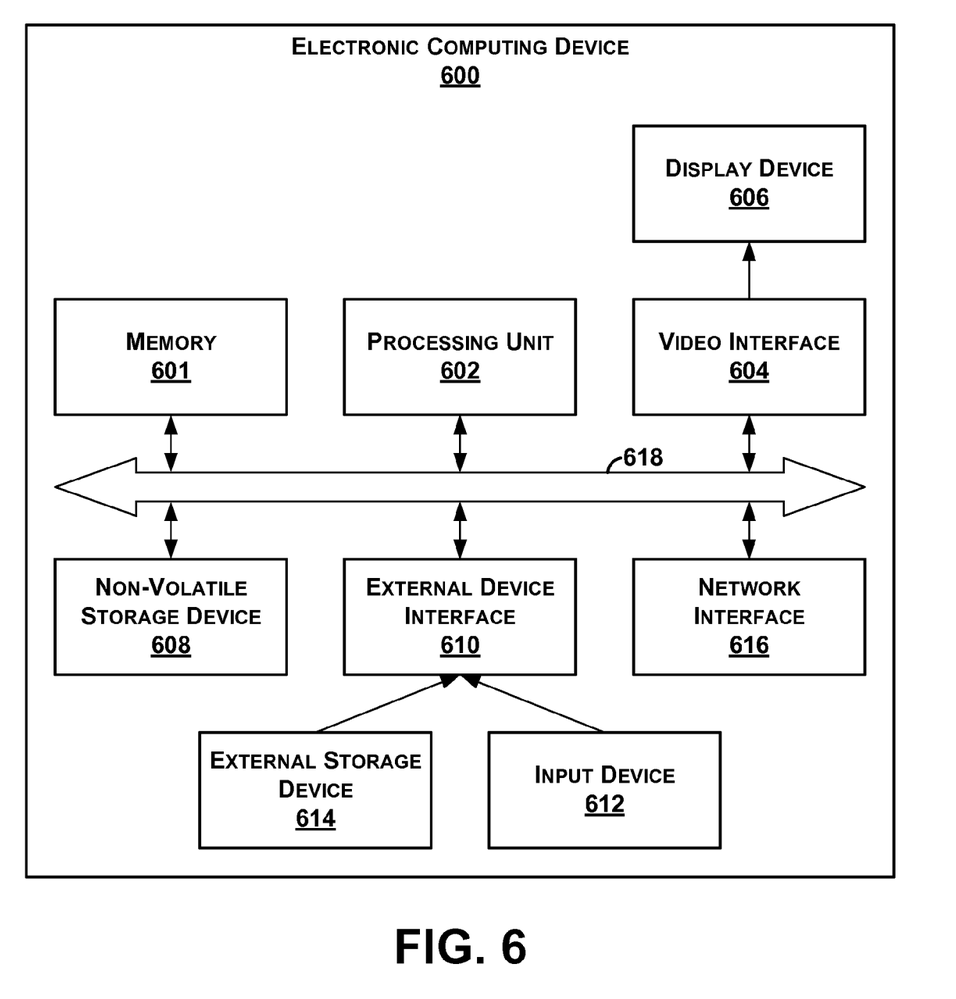
FIG. 6 is a block diagram illustrating example physical details of an electronic computing device.

FIG. 6 is a block diagram illustrating example physical components of electronic computing device 600. As illustrated in the example of FIG. 6, electronic computing device 600 comprises a memory unit 601. Memory unit 601 is a computer-readable storage medium that is capable of storing data and instructions. Memory unit 601 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, electronic computing device 600 comprises a processing unit 602. In a first example, processing unit 602 may execute software instructions that cause processing unit to provide specific functionality. In this first example, processing unit 602 may be implemented as one or more processing cores and/or as one or more separate microprocessors. For instance, in this first example, processing unit 602 may be implemented as one or more Intel Core 2 microprocessors. Processing unit 602 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 602 may be implemented as an application specific integrated circuit (ASIC) that provides specific functionality. In third example, processing unit 602 may provide specific functionality by using an ASIC and by executing software instructions.

Electronic computing device 600 also comprises a video interface 604 that enables electronic computing device 600 to output video information to a display device 606. Display device 606 may be a variety of different types of display devices. For instance, display device 606 may be a cathode-ray tube display, an LCD display panel, a plasma screen display panel, a touch-sensitive display panel, a LED array, or another type of display device.

In addition, electronic computing device 600 includes a non-volatile storage device 608. Non-volatile storage device 608 is a computer-readable storage medium that is capable of storing data and/or instructions. Non-volatile storage device 608 may be a variety of different types of different non-volatile storage devices. For example, non-volatile storage device 608 may be one or more hard disk drives, magnetic tape drives, CD-ROM drives, DVD-ROM drives, Blu-Ray disc drives, or other types of non-volatile storage devices.

Electronic computing device 600 also includes an external component interface 610 that enables electronic computing device 600 to communicate with external components. As illustrated in the example of FIG. 6, external component interface 610 communicates with an input device 612 and an external storage device 614. In one implementation of electronic computing device 600, external component interface 610 is a Universal Serial Bus (USB) interface. In other implementations of electronic computing device 600, electronic computing device 600 may include another type of interface that enables electronic computing device 600 to communicate with input device and/or output devices. For instance, electronic computing device 600 may include a PS/2 interface. Input device 612 may be a variety of different types of devices including, but not limited to keyboards, mice, trackballs, stylus input devices, touch pads, touch-sensitive display screens, or other types of input devices. External storage device 614 may be a variety of different types of computer-readable storage media including magnetic tape, flash memory modules, magnetic disk drives, optical disc drives, and other computer-readable storage media.

In addition, electronic computing device 600 includes a network interface 616 that enables electronic computing device 600 to send data to and receive data from network 8. Network interface 616 may be a variety of different types of network interface. For example, network interface 616 may be an Ethernet interface, a token-ring network interface, a fiber optic network interface, a wireless network interface (e.g., WiFi, WiMax, etc.), or another type of network interface.

Electronic computing device 600 also includes a communications medium 618 that facilitates communication among the various components of electronic computing device 600. Communications medium 618 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Several computer-readable storage media are illustrated in the example of FIG. 6 (i.e., memory unit 601, non-volatile storage device 608, and external storage device 614). Together, these computer-readable storage media may constitute a single logical computer-readable storage medium. This single logical computer-readable storage medium may store instructions executable by processing unit 602. Actions described in the above description may result from the execution of the instructions stored on this single logical computer-readable storage medium. Thus, when this description says that a particular logical module performs a particular action, such a statement may be interpreted to mean that instructions of the software module cause a processing unit, such as processing unit 602, to perform the action.

The technologies of this disclosure may be realized in many ways. For example, the technologies of this disclosure may be realized as a method for online archiving of messaging objects. The method comprises storing a set of available archive retention policy tags in a directory, the set of available archive retention policy tags consisting of archive retention policy tags available to be associated with message objects in a source mailbox. The method also comprises automatically identifying, at an electronic computing system, an archive retention policy tag in the set of available archive retention policy tags as an applicable archive message retention policy tag for a message object stored in a source mailbox. In addition, the method comprises automatically determining, at the electronic computing system, whether a retention period specified by the applicable archive retention policy tag has expired for the message object. Furthermore, the method comprises automatically generating, at the electronic computing system, a copy of the message object at the archive mailbox when the retention period specified by the applicable archive retention policy tag has expired for the message object. The method also comprises automatically deleting, at the electronic computing system, the message object from the source mailbox when the retention period specified by the applicable archive retention policy tag has expired for the message object. The directory, the source mailbox, and the archive mailbox are stored at one or more data storage systems in the electronic computing system.

In another example, the technologies of this disclosure may be realized as an electronic computing device comprising a processing unit, a network interface that enables the electronic computing device to communicate via an electronic communications network with a client system, and a data storage system. The data storage system comprises a directory that stores a set of retention policy tags, the set of retention policy tags including a set of available archive retention policy tags, wherein each archive retention policy tag in the set of available archive retention policy tags is available to be associated with a source mailbox in a source mailbox database. The data storage system also comprises a mailbox database that stores a source mailbox. In addition, the data storage system comprises an archive mailbox database that stores an archive mailbox. The data storage system also comprises a directory server that, when executed by the processing unit, causes the electronic computing device to provide a directory service that enables an administrator of the electronic computing device to create and maintain the retention policy tags in the directory. In addition, the data storage system comprises a mailbox server that, when executed by the processing unit, causes the electronic computing device to automatically identify an archive retention policy tag in the set of available archive retention policy tags as an applicable archive retention policy tag for a message object stored in the source mailbox. The mailbox server also causes the electronic computing device to automatically determine whether a retention period specified by the applicable archive retention policy tag has expired for the message object. In addition, the mailbox server causes the electronic computing device to automatically delete the message object from the source mailbox when the retention period specified by the applicable archive retention policy tag has expired for the message object. The data storage system also comprises an archive mailbox server that, when executed by the processing unit, causes the electronic computing device to automatically generate a copy of the message object at the archive mailbox when the retention period specified by the applicable archive retention policy tag has expired for the message object.

In another example, the technologies of this disclosure may be realized as computer-readable data storage medium comprising instructions that, when executed by a processing unit of an electronic computing device, cause the electronic computing device to store, at a data storage system, a directory that stores a set of retention policy tags, the set of retention policy tags including a set of available archive retention policy tags, wherein each archive retention policy tag in the set of available archive retention policy tags is available to be associated with a source mailbox in a source mailbox database. The instructions also cause the electronic computing device to automatically determine whether the message object explicitly specifies an archive retention policy tag. In addition, the instructions cause the electronic computing device to automatically identify the retention policy tag explicitly specified by the message object as an applicable archive retention policy tag when it is determined that the message object explicitly specifies an archive retention policy tag. Furthermore, the instructions cause the electronic computing device to automatically determine whether the message object is in a folder within the source mailbox when the message object does not explicitly specify an archive retention policy tag. Moreover, the instructions cause the electronic computing device to automatically determine whether the folder is associated with an archive retention policy tag when the message object is in a folder. The instructions also cause the electronic computing device to automatically identify the archive retention policy tag associated with the folder as the applicable archive retention policy tag when it is determined that the message object is in a folder and when it is determined that the folder is associated with an archive retention policy tag. In addition, the instructions cause the electronic computing device to automatically identify a default archive retention policy tag as the applicable archive retention policy tag when it is determined that the message object is not in a folder. Furthermore, the instructions cause the electronic computing device to automatically determine whether a retention period specified by the applicable archive message retention tag has expired for the message object. The instructions also cause the electronic computing device to automatically generate a copy of the message object at the archive mailbox when the retention period specified by the applicable archive retention policy tag has expired for the message object. In addition, the instructions cause the electronic computing device to automatically delete the message object from the source mailbox when the retention period specified by the applicable archive retention policy tag has expired for the message object.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for online archiving of messaging objects, the method comprising:

identifying, by an electronic computing system, an archive retention policy tag in a set of available archive retention policy tags as an applicable archive message retention policy tag for a message object stored in a source mailbox;

wherein identifying the applicable archive retention policy tag comprises:

determining, by the electronic computing system, whether the message object explicitly specifies an archive retention policy tag when a property of the message object specifies an identifier of the archive retention policy tag, wherein the identifier is a globally unique identifier that specifies the archive retention policy tag; and identifying, by the electronic computing system, the retention policy tag explicitly specified by the message object as the applicable archive retention policy tag after determining that the message object explicitly specifies the archive retention policy tag;

determining, by the electronic computing system, whether a retention period specified by the applicable archive retention policy tag has expired for the message object;

generating, by the electronic computing system, a copy of the message object at the archive mailbox after determining that the retention period specified by the applicable archive retention policy tag has expired for the message object; and deleting, by the electronic computing system, the message object from the source mailbox after determining that the retention period specified by the applicable archive retention policy tag has expired for the message object.

2. The method of claim 1, wherein the electronic computing system is an electronic computing device designed particularly to perform the method of claim 1.

3. The method of claim 1, wherein the message object is an email message.

4. The method of claim 1, further comprising:

prior to identifying the applicable archive retention policy tag for the message object, receiving, by the electronic computing system, a request from a client system to explicitly associate the message object with the applicable retention policy tag; and in response to receiving the request, updating, by the electronic computing system, the property of the message object to specify the identifier of the applicable archive retention policy tag.

5. The method of claim 4, further comprising storing in the source mailbox a message object that the client system uses to present the available archive retention policy tags to a user of the client system.

6. The method of claim 1, wherein generating the copy of the message object at the archive mailbox comprises generating the copy of the message object at the archive mailbox such that the copy of the message object does not explicitly specify the applicable archive retention policy tag.

7. The method of claim 1, wherein identifying the applicable archive retention policy tag further comprises:

determining, by the electronic computing system, whether the message object is in a folder within the source mailbox when the message object does not explicitly specify an archive retention policy tag;

determining, by the electronic computing system, whether the folder is associated with an archive retention policy tag when the message object is in a folder;

identifying, by the electronic computing system, the archive retention policy tag associated with the folder as the applicable archive retention policy tag after determining that the message object is in a folder and after determining that the folder is associated with an archive retention policy tag;

identifying, by the electronic computing system, a default archive retention policy tag as the applicable archive retention policy tag after determining that the message object is not in a folder; and identifying, by the electronic computing system, the default archive retention policy tag as the applicable archive retention policy tag after determining that the message object is in a folder and after determining that the folder is not associated with an archive retention policy tag and when no parent folder of the folder is associated with an archive retention policy tag.

8. The method of claim 7, wherein identifying the applicable archive retention policy tag further comprises:

determining, by electronic computing system, whether the folder has a parent folder after determining that the message object is in the folder and after determining that the folder is not associated with an archive retention policy tag;

determining, by the electronic computing system, whether the parent folder is associated with an archive retention policy tag after determining that the folder has a parent folder; and identifying, by the electronic computing system, the archive retention policy tag associated with the parent folder as the applicable archive retention policy tag after determining that the parent folder is associated with an archive retention policy tag.

9. The method of claim 1, further comprising associating, by the electronic computing system, an archive retention policy tag with the message object based on contents of the message object before the electronic computing system adds the message object to the source mailbox.

10. The method of claim 1, further comprising:

storing a set of available deletion retention policy tags in a directory, the set of available deletion policy tags including deletion retention policy tags available to be associated with message objects in the source mailbox;

identifying, by the electronic computing system, a deletion retention policy tag in the set of available deletion retention policy tags as an applicable deletion retention policy tag for the message object;

determining, by the electronic computing system, whether a retention period specified by the applicable deletion retention policy tag has expired for the message object; and deleting, by the electronic computing system, the message object from the archive mailbox after determining that the retention period specified by the applicable deletion retention policy tag has expired for the message object.

11. The method of claim 10, wherein generating the copy of the message object at the archive mailbox comprises generating, by the electronic computing system, the copy of the message object such that the copy of the message object explicitly specifies the applicable deletion retention policy tag.

12. The method of claim 1, further comprising enabling, by the electronic computing system, at least one client system to access the source mailbox and the archive mailbox via an electronic communications network.

13. The method of claim 1, wherein the method further comprises: storing the set of available archive retention policy tags in a directory, each of the available archive retention policy tags being an archive retention policy tag available to be associated with message objects in the source mailbox; and wherein the directory, the source mailbox, and the archive mailbox are stored at one or more data storage systems in the electronic computing system.

14. An electronic computing device comprising:

a processing unit;

a network interface that enables the electronic computing device to communicate via an electronic communications network with a client system; and a data storage system that comprises:

a directory that stores a set of retention policy tags, the set of retention policy tags including a set of available archive retention policy tags, wherein each archive retention policy tag in the set of available archive retention policy tags is available to be associated with a source mailbox in a source mailbox database;

a mailbox database that stores the source mailbox;

an archive mailbox database that stores an archive mailbox; and instructions that are executed by the processing unit, execution of the instructions by the processing unit causing the electronic computing device to:

provide a directory service that enables an administrator of the electronic computing device to create and maintain the retention policy tags in the directory;

determine whether a message object explicitly specifies a given archive retention policy tag as an applicable archive retention policy tag, the given archive retention policy tag being in the set of available archive retention policy tags, the message object stored in the source mailbox;

identify the given retention policy tag as the applicable archive retention policy tag after determining that the message object explicitly specifies the archive retention policy tag, the message object also specifying:

an expiration date property indicating a date when a retention period will expire for the message object;

a retention period property indicating a length of the retention period for the message object;

a start date property indicating a date when the retention period starts for the message object; and a flags property indicating that the retention policy is associated with the message object;

determine whether the retention period specified by the applicable archive retention policy tag has expired for the message object;

delete the message object from the source mailbox when the retention period specified by the applicable archive retention policy tag has expired for the message object; and generate a copy of the message object at the archive mailbox when the retention period specified by the applicable archive retention policy tag has expired for the message object.

15. The electronic computing device of claim 14, wherein execution of the instructions causes the electronic computing device to enable the client system to access the source mailbox and the archive mailbox.

16. The electronic computing device of claim 14, wherein execution of the instructions causes the electronic computing device to:

determine whether the message object is in a folder within the source mailbox after determining that the message object does not explicitly specify an archive retention policy tag;

determine whether the folder is associated with an archive retention policy tag after determining that that the message object is in the folder;

identify the archive retention policy tag associated with the folder as the applicable archive retention policy tag after determining that the message object is in the folder and after determining that the folder is associated with an archive retention policy tag;

identify a default archive retention policy tag as the applicable archive retention policy tag after determining that the message object is not in the folder; and identify the default archive retention policy tag as the applicable archive retention policy tag after determining that the message object is in the folder and after determining that the folder is not associated with an archive retention policy tag.

17. The electronic computing device of claim 16, wherein execution of the instructions causes the electronic computing device to identify the applicable archive retention policy tag by causing the electronic computing device to:

determine whether the folder has a parent folder after determining that the message object is in a folder and after determining that the folder is not associated with an archive retention policy tag;

determine whether the parent folder is associated with an archive retention policy tag after determining that the folder has the parent folder; and identify the archive retention policy tag associated with the parent folder as the applicable archive retention policy tag after determining that the parent folder is associated with an archive retention policy tag.

18. The electronic computing device of claim 14, wherein the message object is an email message.

* * * * *